L. M. PARKER.
Fruit-Gatherer.

No. { 471, 31,475. }

Patented Feb. 19, 1861.

Witnesses:
F. P. Hale
Arthur Neill

Inventor:
L. M. Parker

UNITED STATES PATENT OFFICE.

LEONARD M. PARKER, OF SHIRLEY VILLAGE, MASSACHUSETTS.

IMPROVED FRUIT-GATHERER.

Specification forming part of Letters Patent No. 31,475, dated February 19, 1861

*To all whom it may concern:*

Be it known that I, LEONARD M. PARKER, of Shirley Village, in the county of Middlesex and State of Massachusetts, have invented an Improved Fruit-Gatherer; and I do hereby declare the same to be fully described in the following specification and illustrated in the accompanying drawings, of which—

Figure 1:
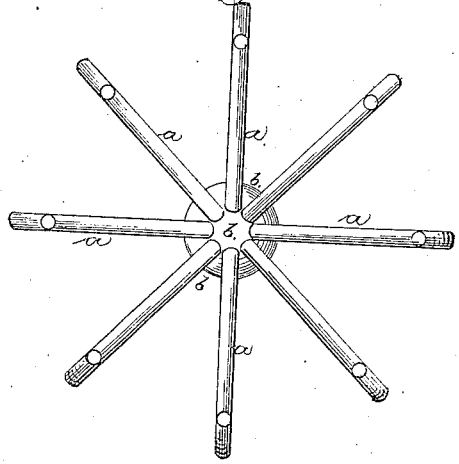
Figure 2:
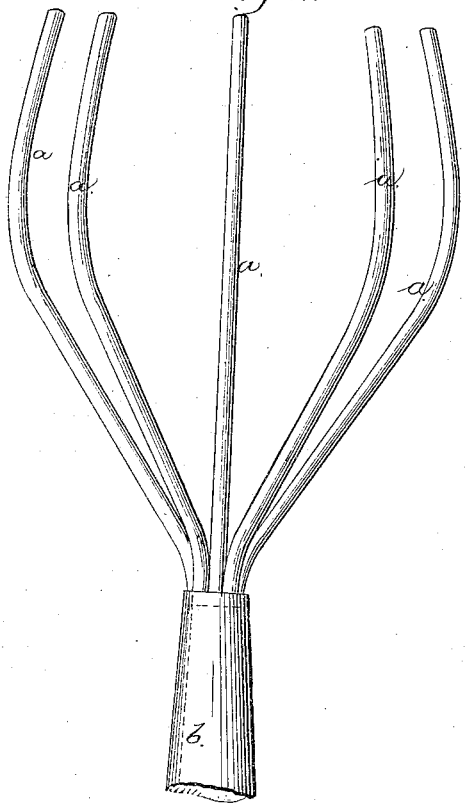

Figure 1 is a top view, and Fig. 2 a side elevation, of it.

In constructing the said fruit-gatherer I make it of a series of prongs, $a\ a\ a\ a$, of round wire, united together at one end of each, or to a shank, or a tubular socket, $b$, by which such prongs may be affixed to the end of a pole. These wires are to be arranged in a circle and close together at their lower ends, or where they are connected with the socket $b$, and from thence each wire is to be spread out, so as not only to make a very acute angle with that one next to either side of it, but an acute angle with the prolongation of the axis of the shank or socket, after which each wire is to be curved inward, substantially as shown in the drawings. This bend of each wire is a matter of much importance, as it contributes much to the efficiency of the fruit-gatherer in retaining an apple, pear, or other kind of fruit after the same may have been detached from a tree by means of such implement. The wire prongs being round and smooth are not so likely as saw-teeth or notches in plates to injure or bruise the fruit; and, furthermore, there is an elasticity or spring to them, which operates to advantage in enabling them to grasp and retain an apple or other kind of fruit while it is in the act of being separated from a tree by the instrument.

In using this fruit-gatherer it is to be so moved toward the fruit as to cause the latter to so pass into the space within the series of prongs as to have its stem extend into the angle between two of the prongs. By a quick longitudinal or a transverse movement of the implement the fruit may be separated from the tree and retained by the prongs.

I do not claim a single fork of two prongs extending from a shank; nor do I claim a fruit-gatherer composed of either a cylindrical or a tapering metallic vessel furnished with a series of triangular teeth upon its upper edge.

I claim—

My improved fruit-picker, as made of a series of wires bent and arranged in manner and connected with a shank or pole-socket, substantially as specified.

LEONARD M. PARKER.

Witnesses:
ISRAEL LONGLEY,
F. P. HALE, Jr.